Oct. 22, 1935. J. JUERGENS 2,018,448
AIRCRAFT
Filed July 14, 1932 6 Sheets-Sheet 1
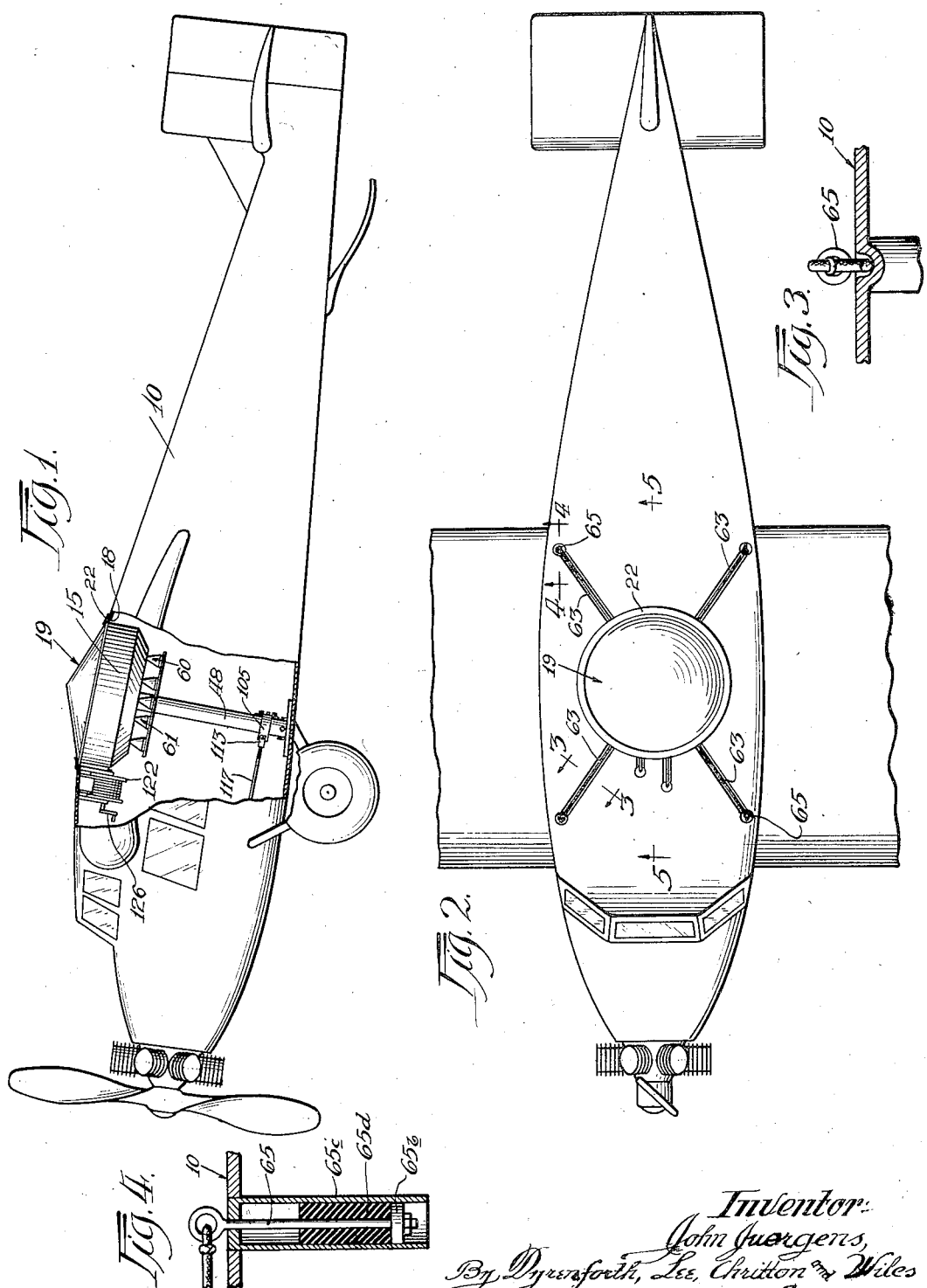

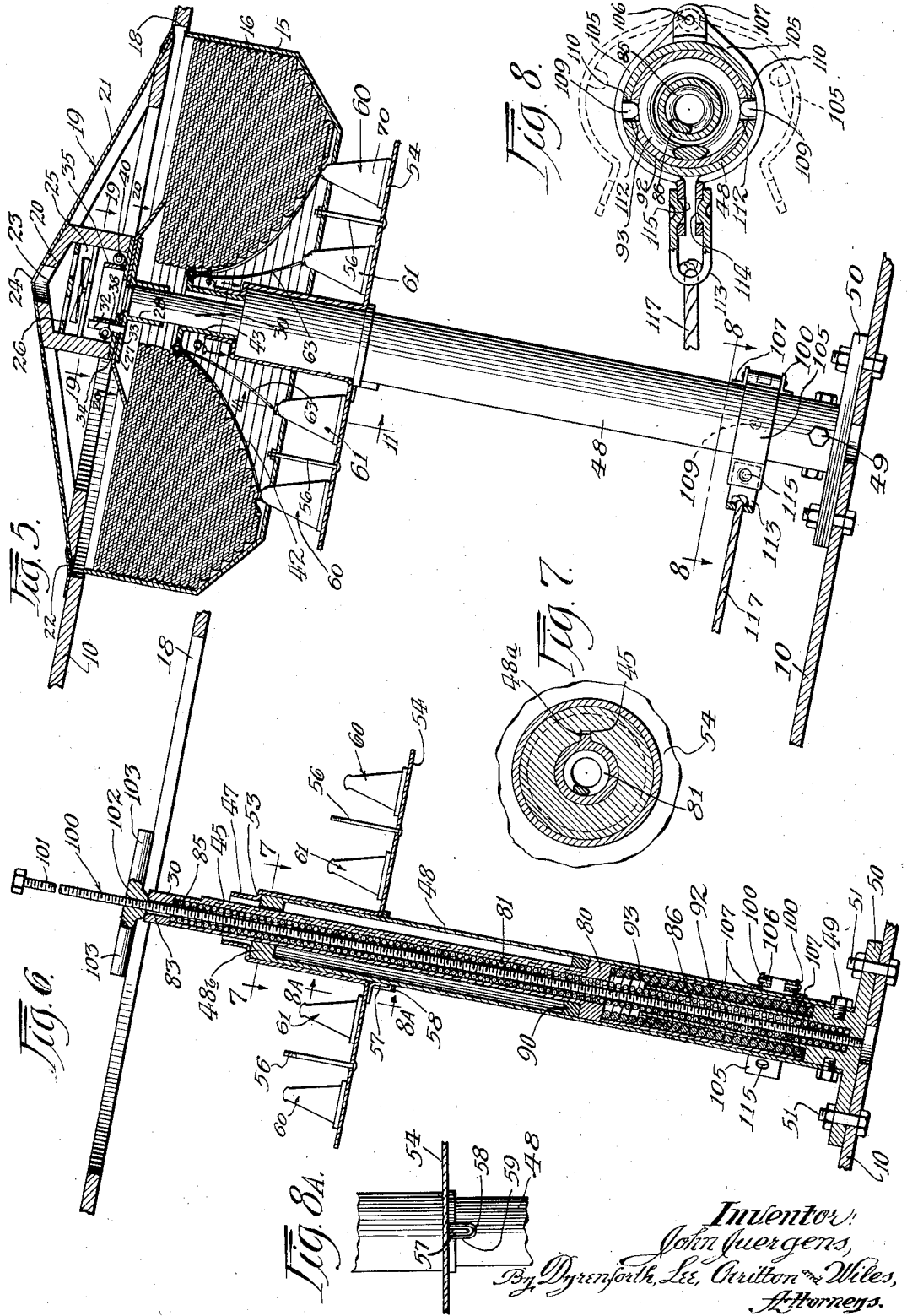

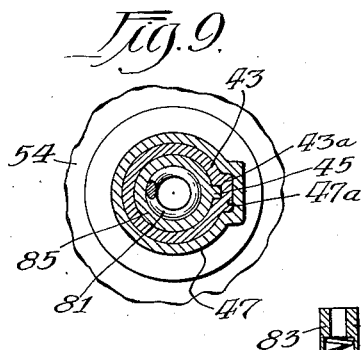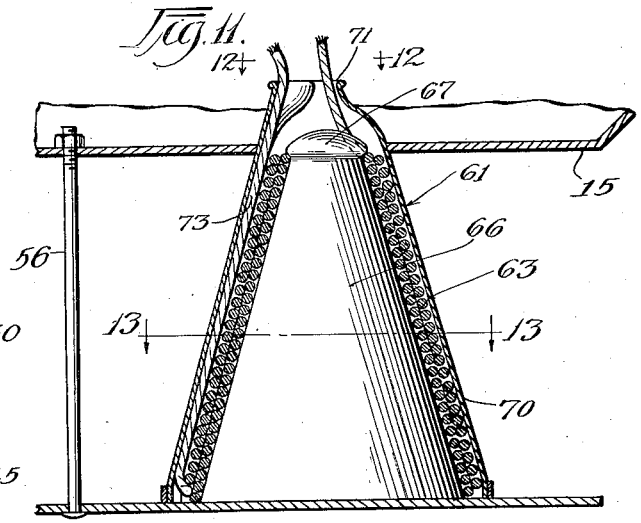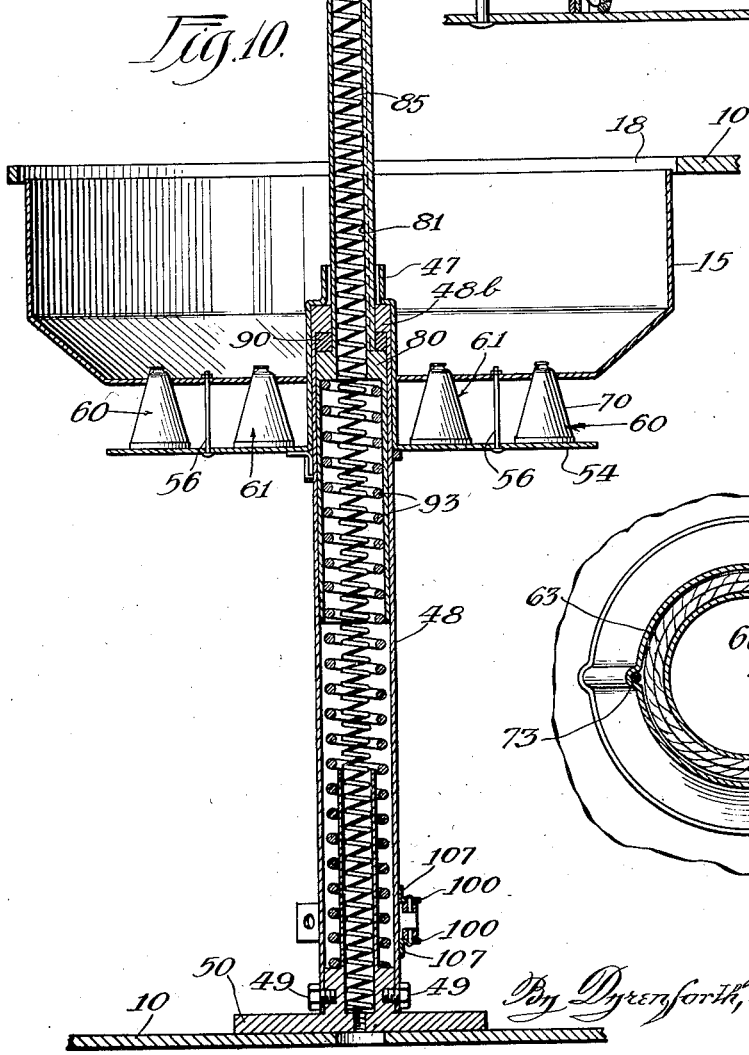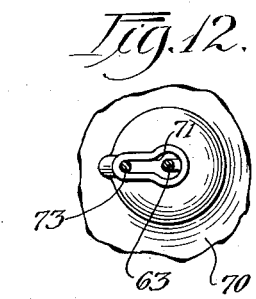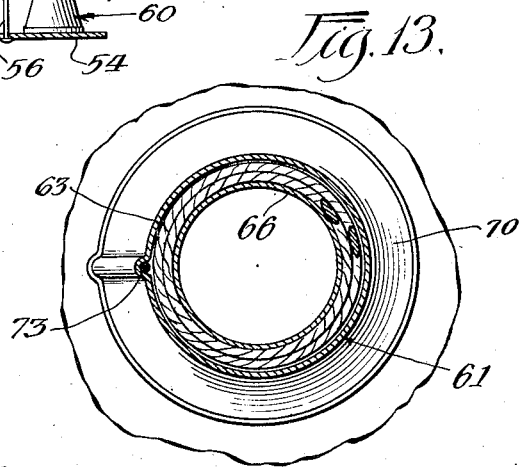

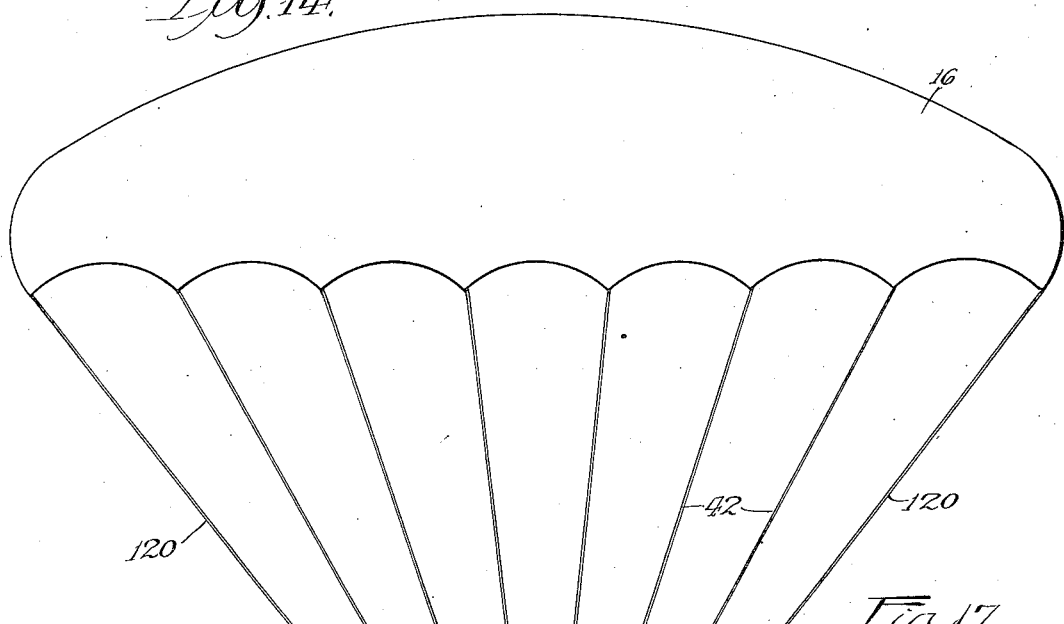
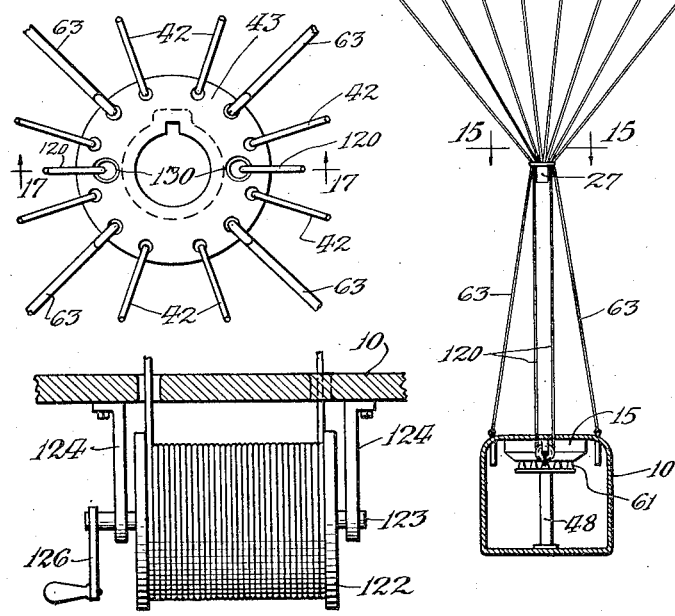

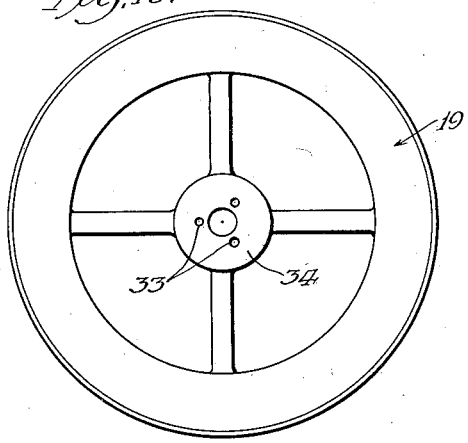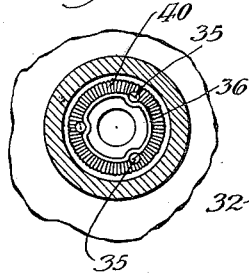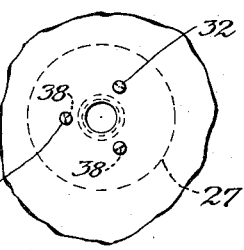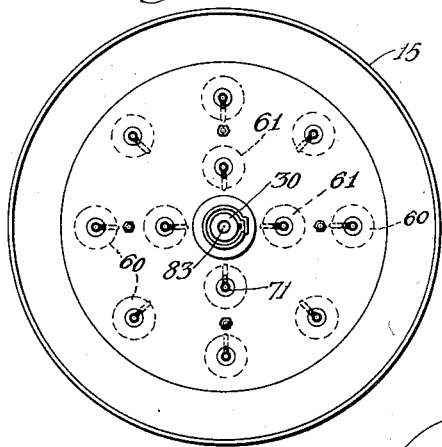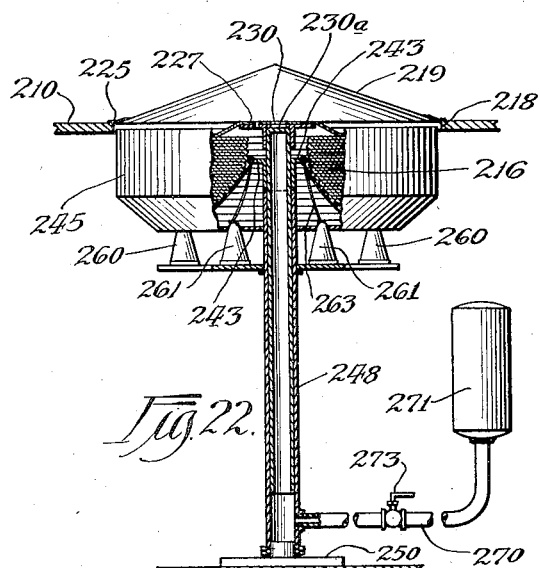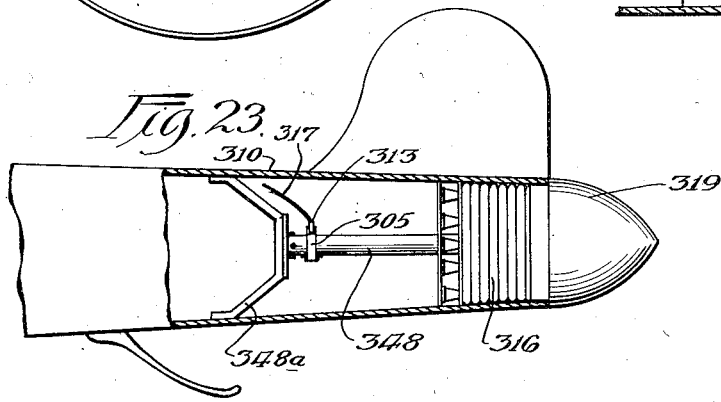

Oct. 22, 1935.  J. JUERGENS  2,018,448
AIRCRAFT
Filed July 14, 1932  6 Sheets-Sheet 6

Inventor:
John Juergens,
By Dyrenforth, Lee, Chritton & Wiles,
Attorneys.

Patented Oct. 22, 1935

2,018,448

UNITED STATES PATENT OFFICE 2,018,448

AIRCRAFT

John Juergens, Chicago, Ill., assignor of eleven and twenty-five one-hundredths per cent to Michael J. Hayes, eleven and twenty-five one-hundredths per cent to Robert J. Thompson, eleven and twenty-five one-hundredths per cent to Louis G. Bunker, eleven and twenty-five one-hundredths per cent to William J. O'Brien, and five per cent to Edward T. Howe, all of Chicago, Ill.

Application July 14, 1932, Serial No. 622,536

6 Claims. (Cl. 244—21)

The invention relates to aircraft and particularly to airplanes, etc., which are provided with parachutes to enable them to descend with safety when they have become disabled.

In aircraft embodying the invention, the parachutes are controlled by the operator of the aircraft and may be released whenever it becomes necessary to do so. The parachutes are provided with improved means for projecting them forcibly from the aircraft so that they will not become entangled in the wings, rudders, or other parts of the aircraft while they are opening. The construction is such that the operator of an airship which embodies the invention may release the parachute substantially instantaneously when the airship becomes disabled and the parachute will be shot forcibly in a direction away from the airship and in a folded or partly folded condition so that when it opens, it will be correctly positioned to sustain the weight of the device to which it is attached.

In some embodiments of the invention, means is provided whereby the operator may tilt the parachutes and control the descent of the airship to the ground.

Other objects and advantages will become apparent as the following detailed description progresses, reference being had to the accompanying drawings, wherein—

Figure 1 is a side elevation, partly broken away, of an airplane which embodies the invention.

Figure 2 is a fragmentary plan view of the improved airplane shown in Figure 1.

Figure 3 is an enlarged fragmentary section taken on line 3—3 of Figure 2.

Figure 4 is an enlarged fragmentary section taken on line 4—4 of Figure 2.

Figure 5 is an enlarged fragmentary section taken on line 5—5 of Figure 2.

Figure 6 is a section taken on the same line as Figure 5, the parachute and the container therefor being omitted.

Figure 7 is a section taken on line 7—7 of Figure 6.

Figure 8 is a section taken on line 8—8 of Figure 5.

Figure 8A is a section taken on line 8A—8A of Figure 6.

Figure 9 is a section taken on line 9—9 of Figure 5.

Figure 10 is a section taken on the same line as Figure 6, certain parts of the mechanism being shown in changed positions.

Figure 11 is a section taken on line 11—11 of Figure 5.

Figure 12 is a section taken on line 12—12 of Figure 11.

Figure 13 is a section taken on line 13—13 of Figure 11.

Figure 14 is a section taken transversely through the airplane with the parachute in its functionally operative position.

Figure 15 is an enlarged section taken on line 15—15 of Figure 14.

Figure 16 is a section taken on line 16—16 of Figure 17.

Figure 17 is a section taken substantially on the same line as Figure 14.

Figure 18 is a bottom view of a cap or weight which forms part of the apparatus for forcibly projecting the parachute from the airplane.

Figure 19 is a section taken on line 19—19 of Figure 5.

Figure 20 is a section taken on line 20—20 of Figure 5.

Figure 24:
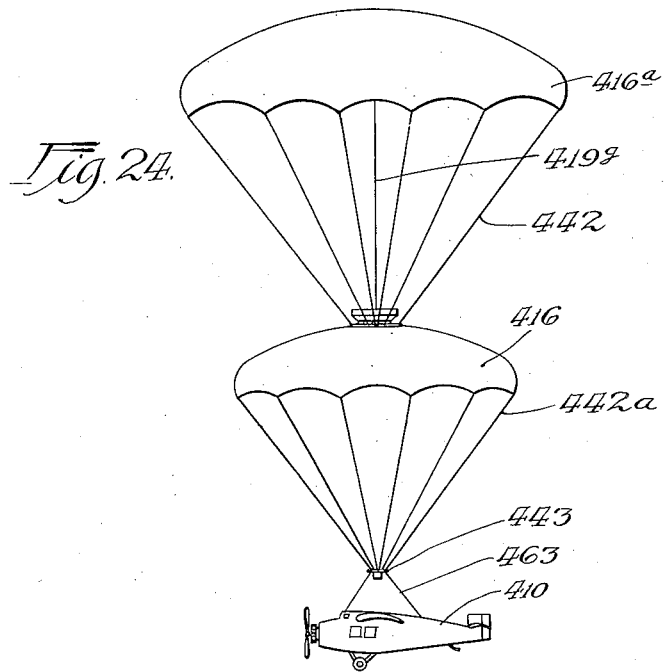
Figure 25:
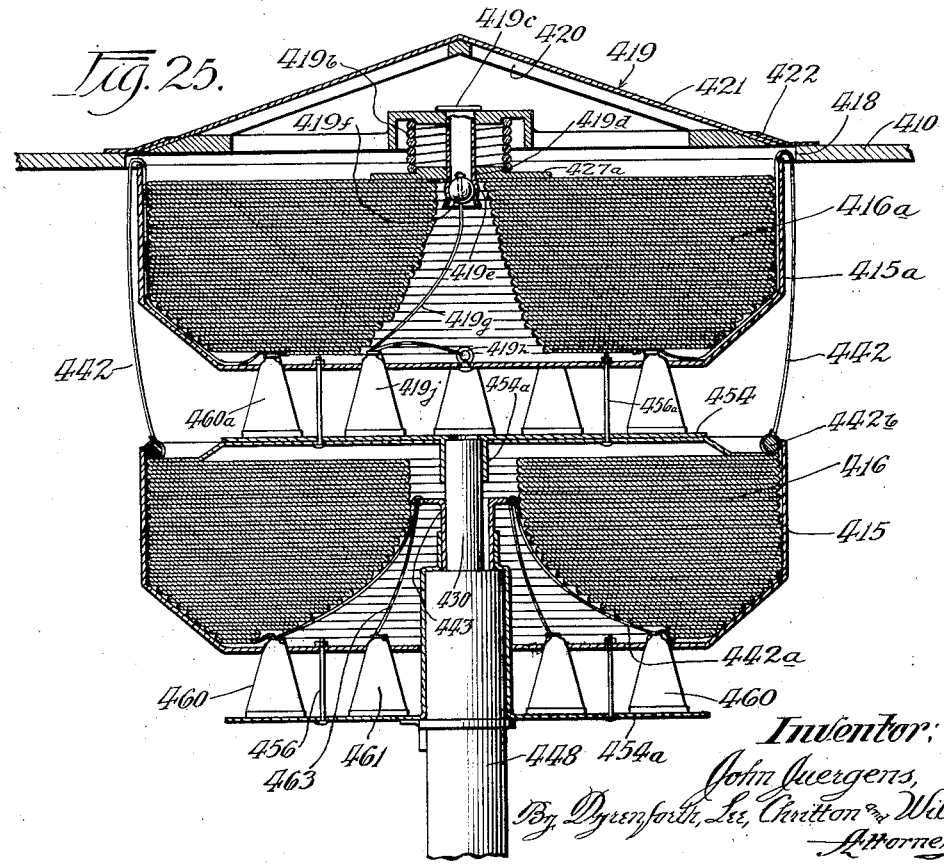

Figure 21 is a plan view of the parachute housing with its closure removed; Figure 22 is a view in elevation partly broken away of a modified parachute housing construction; Figure 23 is a view in elevation partly broken of a further modification; Figure 24 is a view in elevation of aircraft supported by parachutes arranged in tandem; and Figure 25 is an enlarged sectional view of the housing employed in the modification shown in Fig. 24.

Referring for the present to Figures 1 to 21, inclusive, the reference character 10 designates the fuselage of an airplane which comprises the usual internal combustion engine, landing gear, etc. Disposed in the fuselage 10, preferably in back of the pilot's seat, is a housing 15 in which a parachute 16 is folded.

The housing 15 is open at its top and is in registry with an aperture 18 formed in the top wall of the fuselage 10. The aperture 18 is normally closed by a closure member 19 which also serves as a weight and assists in withdrawing the parachute 16 from the housing 15. The closure member or weight 19 preferably comprises a conical sheet metal member 21 which is secured to a head 20, the head 20 being the part which provides the weight necessary to project the parachute 16 from the housing 15. The closure member 19 is preferably secured to the top wall of the fuselage 10 by adhesive tape 22, the construction being such that when certain mechanism hereinafter described is actuated to release the parachute, the closure member 19 will be torn loose from the fuselage 10. The sheet metal member 21 and the head 20 are provided with registering apertures 23 and 24, respectively, which communicate with a chamber 25 provided in the head 20. Disposed in the chamber 25 is a siren 26, the purpose of which is hereinafter described.

The central portion of the parachute 16 is secured to a disc 27 provided with a downwardly extending tubular extension 28 which receives the upper end of a plunger 30, the construction being such that when the plunger 30 is displaced upwardly, it carries the disc 27 and the central portion of the parachute 16 with it.

Projecting upwardly from the disc 27 and rigidly secured thereto are a plurality of pins 32 which project through apertures 33 provided in an apertured disc 34 secured to the head 20. (See Figs. 5, 18, 19 and 20). The pins 32 are partially disposed in grooves 35 formed in a tubular member 36 which is rigidly secured to the disc 34. The pins 32 are provided with notches 38 which receive a coiled spring 40, the spring 40 being adapted to secure the closure member 19 detachably to the disc 27.

The periphery of the parachute 16 is connected by shroud lines 42 to a tubular member 43 slidably mounted on the plunger 30, the plunger 30 being provided with a key 45 which prevents angular displacement of the tubular member 43 around the plunger. When the tubular member 43 is assembled with the plunger 30, its lower end projects into a tubular member 47 seated on the upper end of a tubular housing member 48 which has its lower end secured by bolts 49 to a bracket member 50. The bracket member 50 is secured to the plunger 10 by bolts 51.

It will be noted that the upper end of the tubular member 47 is of reduced diameter and provides a shoulder 53 which seats upon the upper end of the tubular housing member 48. As best shown in Fig. 9, the tubular member 43 has a key portion 43a which projects into a keyway 47a formed in the tubular member 47. The key 43a co-operates with the keyway 47a to prevent angular displacement of the tubular member 47 around its longitudinal axis.

Formed integral with the tubular member 47 at the lower end thereof is a disc 54 to which the housing member 15 is secured by a plurality of bolts 56. (Figs. 5 and 6). A bent member 57, secured to the bottom surface of the disc 54, normally rests in a slot 58 which is formed by a bent bar 59 secured to the tubular housing member 48. (See Figs. 6 and 8A). The bent member 57 co-operates with the bent bar 59 to prevent angular displacement of the tubular member 47 and the disc 54 around the tubular housing member 48. The disc 54 carries a plurality of spool devices 60 and 61, the spool devices 60 being adapted to hold the shroud lines 42 and the spool devices 61 being adapted to hold four anchor lines 63. One end of each anchor line 63 is secured to the tubular member 43 and the other end thereof is secured to an eye or ring 65 which is secured to the fuselage 10.

The spool devices 60 and 61 are preferably identical in construction. The construction of one of the spool devices 61 is illustrated in detail in Figs. 11, 12 and 13. It comprises a tapered spool member 66 provided with a button-like head 67. The spool member 66 is fixed rigidly to the disc 54. The intermediate portion of one of the anchor lines 63 is coiled around the spool members 66 in the manner illustrated in Fig. 11. Surrounding the spool member 66 and the coiled anchor line 63 is a conical housing member 70 which holds the shroud line in place upon the spool member 66. It will be noted that the upper end of the conical housing member 70 is provided with an aperture 71 through which the anchor line 63 is threaded. One portion of the anchor line passes through a groove 73 formed in the conical housing member 70.

When the parachute 16 is projected from the fuselage 10, the shroud lines 42 pull the tubular member 43 off the upper end of the plunger 30 and the shroud lines as well as the anchor lines 63 are uncoiled from the spools 66 in such manner that they do not become entangled with each other. As stated above, the shroud lines extend from the outer periphery of the parachute to the tubular member 43 which is relatively small in diameter. The anchor lines secure the tubular member 43 to the fuselage. This construction prevents the airplane from tipping the parachute as the small amount the tubular member 43 will be tipped when the airplane rolls during its descent will not be sufficient to tip the parachute to any appreciable extent.

As illustrated in Figs. 6 and 7, the key 45 on the plunger 30 rides in a keyway 48a formed in the upper end of the tubular housing member 48. This prevents the plunger 30 from being displaced angularly around its longitudinal axis. The upper end of the plunger 30 is of reduced diameter as compared with its lower end, the lower end of the plunger being identified by the reference character 80. A bore 81 formed in the upper end of the plunger 30 extends upwardly to a point adjacent the top surface thereof. A smaller bore 83 extending into the plunger 30 from the upper surface thereof communicates with the bore 81. A helical spring 85 has its upper end disposed in the bore 81 and has its lower end disposed in a tubular sleeve 86 which is preferably formed integral with the bracket member 50. The construction is such that the spring 85 yieldingly urges the plunger 30 upwardly. The tubular housing member 48 is provided with a top wall 48b in which the keyway 48a is formed. A rubber bumper 90 carried by the upper end of the enlarged portion 80 of the plunger 30 is engageable with the top wall 48b and serves to absorb the shock when the plunger 30 is driven upwardly by the spring 85 and a co-operating spring 92. The spring 92 is disposed in a bore 93 formed in the portion 80 of the plunger 30. It will be noted that the sleeve 86 is disposed between the spring 85 and the spring 92 and prevents the coils of the springs from becoming entangled with each other. For the same purpose, one of the springs is preferably wound with right hand coils and the other is wound with left hand coils.

The springs 85 and 92 are tensioned by means comprising a tool which is designated generally by the reference character 100. The tool 100 comprises a bolt 101 upon which a nut 102 is screw threaded, the nut 102 being provided with handles 103 whereby it may be turned. When the springs 85 and 92 are to be tensioned, the bolt 101 is inserted through the plunger 30 as illustrated in Fig. 6 and its lower end is screw threaded into the bracket member 50. The nut 102 is then rotated to displace the plunger 30 downwardly until the springs 85 and 92 have been compressed the required amount. As best shown in Figs. 5, 6 and 8, means is provided for locking the plunger 30 in its retracted position with the springs 85 and 92 compressed. This means comprises latch members 105 which are pivoted on a pin 106 carried by bracket members 107, the bracket members 107 being rigidly secured to the tubular housing member 48. Pins 109 projecting from the latch members 105 are lined with apertures 110 provided in the tubular housing member 48, the construction being such that the latch members may be swung from the positions they are shown in dotted lines in Fig. 8 into the positions wherein they are shown in full lines in the same figure. When the latch members 105 are brought into their functionally operative positions as illustrated in full lines in Fig. 8, the pins 109 project through the apertures 110 and into apertures 112 provided in the portion 80 of the plunger 30, the apertures 112 being brought into alinement with the apertures 110 when the springs 85 and 92 are compressed the required amount. When the pins project into the apertures 112, they lock the plunger 30 in its retracted position.

To secure the latch members 105 in their locking positions, a clip member 113 is sprung over the free ends thereof, the clip member 113 being provided with projections 114 which are engageable with apertures 115 provided in the free ends of the latch members. A cable 117 has one end secured to the clip member 113 and has its other end disposed adjacent the pilot seat so that the pilot may release the latch members 105 at any time by pulling on the cable. The inner ends of the pins 109 are rounded so that when the clip member is withdrawn from the latch members 105, the plunger 30 will displace the pins 109 outwardly under the action of the springs 85 and 92. These springs will then project the plunger 30 upwardly with sufficient force to drive the closure member 19 away from the airplane and the closure member 19 will pull the parachute 16 with it until the anchor lines 42 and the shroud lines 63 are fully extended. As soon as the anchor and shroud lines have been drawn taut, the weight of the closure member 19 will cause it to detach itself from the disc 27. In other words, the spring 40 will yield sufficiently to permit it to ride out of the notches 38 in the pins 32 whereupon the entire closure member 19 will be detached from the disc 27 and will fall to the earth. The siren 26 will then function and serve as a warning to people below the airplane.

As best shown in Fig. 4, the rings or eyes 65 to which the anchor lines 63 are secured are formed at the upper ends of rods 65a which are provided with collars 65b at their lower ends. The collars 65b are slidably journaled in tubular housings 65c which are rigidly secured to the fuselage 10. Each rod 65a is provided with a rubber bumper 65d, the construction being such that when the rods 65a are drawn violently outward by the anchor lines 42, part of the shock on the fuselage 10 is absorbed by the rubber bumpers which engage the outer ends of the tubular housings 65c.

As best shown in Figs. 14 to 17, inclusive, the parachute 16 is preferably provided with control lines 120. The control lines 120 are preferably a continuous line which has its intermediate portion wound around a drum 122 fixed to a shaft 123 which is journaled in bracket members 124 secured to the fuselage 10. A crank lever 126 fixed to the shaft 123 may be employed to rotate the drum 122. The control lines 120 are wound upon the drum 122 in such manner that if the drum is rotated in one direction, one of the lines will be wound upon the drum and the other line will be unwound so that the parachute will be tilted in one direction. If the drum is rotated in the opposite direction, the parachute will be tilted in the opposite direction. This permits the pilot to maneuver the airplane during its descent so as to avoid buildings, etc. As illustrated in Figs. 15 and 17, the control lines 120 pass through apertures 130 in the tubular member 43.

The operation of the above described apparatus is substantially as follows: It will be readily understood that the springs 85 and 92 may be compressed in the manner described above and that the tool 100 is removed from the plunger 30 after the latch members 105 have been secured in their functionally operative positions by the clip 113. This compression of the springs 85 and 92 may take place either before or after the anchor and shroud lines have been coiled in the spool devices 60 and 61 and the parachute 16 has been folded in the housing member 15. If it is assumed that the springs 85 and 92 have been compressed and that the anchor and shroud lines and the parachute 16 have been arranged as illustrated in Fig. 5, it will be readily understood that the closure member 19 may be secured to the fuselage 10 by the tape 22. The apparatus is then ready to function at any time. Thus, if, while the airplane is in flight the engine stalls, the pilot may pull on the cable 117 to release the latch members 105 whereupon the parachute 16 will be projected from the housing member 15 and will become inflated to its full extent during the descent of the airplane. The parachute is preferably of such proportions that the airplane will fall to the ground at such slow speed that it will not be materially damaged when it strikes the ground.

Another form of the invention is illustrated in Fig. 22 wherein a parachute 216 is shown folded in a housing member 215, the housing member 215 being open at its top and being in registry with an aperture 218 provided in the top wall of the fuselage 210. The aperture 218 is normally closed by the closure member 219 which is secured detachably to the fuselage 210 by adhesive tape 225. The central portion of the parachute 216 is secured to a disc 227 which has the same function as the disc 27 described above. The closure member 219 is detachably secured to the disc 227 by means (not shown) which is preferably identical with the means described above for securing the closure member 19 to the disc 27. The parachute 216 is secured to the fuselage 210 by anchor lines 263, each of which has one end secured to the fuselage 210 and has its other end secured to a tubular member 243 which is identical in construction with the tubular member 43 described above. The tubular member 243 is secured to the periphery of the parachute 216 by shroud lines (not shown). When the parachute is folded in the housing member 215, the anchor and shroud lines are coiled in spool devices 261 and 260, respectively.

The apparatus described above in connection with Fig. 22 is preferably identical in construction with similar apparatus illustrated in Figs. 1 to 21, inclusive, and has the same functions. In Fig. 22, the plunger 30 shown in Figs. 5 and 6 is replaced by a plunger 230 which is slidably journaled in a tubular housing member 248, the lower end of the housing member 248 being fixed to a bracket member 250 which is secured to the fuselage 210. The plunger 230 is preferably hollow and is provided with an end wall 230a at its upper end. Communicating with the interior of the tubular housing member 248 is a pipe 270 which connects the housing member 248 with a tank 271 holding a supply of compressed air, or the equivalent, for the purpose. The flow of the compressed fluid through the pipe 270 is controlled by a manually operable valve 273. The compressed fluid is employed in place of the springs 85 and 92, described above. It will be readily understood that when the valve 273 is open, the compressed fluid will flow through the pipe 270 into the housing member 248 and the plunger 230 will be driven upwardly and will carry the parachute 216 with it. The valve 273 is preferably positioned adjacent the pilot's seat so that it may be opened at any time.

Another form of the invention is illustrated in Fig. 23. In this instance, the tail of an airplane is provided with a cap 319 which has the same function as the closure members 19 and 219 described above. The fuselage of the airplane shown in Fig. 23 is designated generally by the reference character 310.

The parachute 316 folded in the tail end of the fuselage 310 is detachably secured to the cap 319 in the same manner as the parachute 16 is secured detachably to the closure member 19, the periphery of the parachute 316 being secured to the fuselage 310 by anchor and shroud lines (not shown). The means for projecting the parachute 316 from the fuselage 310 comprises a tubular housing member 348 which contains mechanism substantially identical with the mechanism housed within the tubular member 48 described above. The inner end of the housing member 348 is rigidly secured to the fuselage 310 by a bracket 348a. Pivoted to the housing member 348 are latch members 305 which have the same function as the latch members 105 described above. A clip 313 detachably secures the latch members 305 in their locking positions and is provided with a cable 317 whereby the pilot may release the latch members 305. It will be readily understood that when the latch members 305 are released, the mechanism within the member 348 will function to drive the cap 319 and the parachute 316 outwardly until the shroud and anchor lines (not shown) are fully extended, whereupon the cap 319 will detach itself from the parachute and fall to the ground.

Still another form of the invention is shown in Figs. 24 and 25. The fuselage of an airplane is designated generally by the reference character 410 and is provided with parachutes 416 and 416a, the parachute 416a being secured to the parachute 416 by shroud lines 442 and the parachute 416 being secured to a tubular member 443 by shroud lines 442a. The tubular member 443 is secured to the fuselage 410 by anchor lines 463.

Figure 25 illustrates the manner in which the parachutes 416 and 416a are stored within the fuselage 410. The parachute 416 is folded in a housing 415 and the parachute 416 is stored within the housing 415a. Each of the housing members 415 and 415a is open at its top and the housing member 415a is alined with an aperture 418 provided in the top wall of the fuselage 410. The aperture 418 is normally closed by a closure member 419 which has the same function as the closure member 19 described above. The closure member 419 comprises a conical sheet metal member 421 and a heavy similarly shaped member 420 to which the sheet metal member is secured. The closure member 419 is secured detachably to the fuselage 410 by adhesive tape 422, or the equivalent, for the purpose.

The central portion of the parachute 416a is secured to a disc 427a. Interposed between the disc 427a and the member 420 is a spring 419b which is normally under compression. Projecting downwardly from the heavy member 420 is a tubular member 419c which passes through an aperture 419d provided in the disc 427a. At its lower end, the tubular member 419c is enlarged as at 419e to receive a ball 419f. The ball 419f is fixed to one end of a cable 419g which has its other end secured to a ring 419h fixed to the housing member 415a. The intermediate portion of the cable 419g is coiled in a spool device 419j which is substantially identical in construction with the spool devices 60 and 61, described above. The construction is such that when the parachute 416a is forcibly ejected from the fuselage 410 in a manner hereinafter described, the heavy member 420 will withdraw the parachute 416a from the housing member 415a and the shroud lines 442 will be drawn taut. The cable 419g will be drawn taut at the same time and is of such length that it will pull the ball 419f from the enlarged end of the tubular member 419c, whereupon the tubular member 19c will slip through the aperture 419d so that the closure member 419 will be detached from the parachute 416a. The closure member 419 will then fall to the ground.

The central portion of the parachute 416 is secured to a disc 454 provided with a tubular downwardly projecting boss 454a loosely seated on the upper end of a plunger 430. The plunger 430 is identical in construction with the plunger 30 described above and is actuated by similar mechanism (not shown) disposed in a housing 448 which is identical in construction with the housing 48 described above. The shroud lines 442a connect the periphery of the parachute 416 with a tubular member 443 which is identical with the tubular member 43 described above and has the same function. The intermediate portions of the shroud lines 442a are coiled in spool devices 460 carried by a disc 454a mounted on the upper end of the housing member 448. The disc 454a is rigidly secured to the housing member 415 by bolts 456. It will be noted that similar bolts 456a rigidly secure the disc 454 to the housing member 415a.

The intermediate portions of the anchor lines 463 are coiled in spool devices 461 fixed to the disc 454a. The spool devices 460 and 461 are identical in construction with the spool devices 60 and 61 described above.

The intermediate portions of the shroud lines 442 are coiled in spool devices 460a which are identical in construction with the spool devices 460. One end of each shroud line 442 is connected to the parachute 416a and the other end thereof is connected to a ring 442b rigidly secured to the housing member 415.

The operation of the apparatus shown in Figs. 24 and 25 is substantially as follows: When the parachutes 416 and 416a are to be discharged through the aperture 418, the pilot pulls a cable (not shown) which actuates mechanism (not shown) which is similar to that shown in connection with the plunger 30, to release the plunger 430 and the plunger 430 is then driven upwardly and carries parachutes 416 and 416a, the disc 454, the housing member 415a, the spool devices 460a and the closure member 419 with it and forcibly ejects these parts through the opening 418. The weight of the closure member 419 insures that the shroud lines of the parachutes 416 and 416a will be fully extended above the airplane and when they have been fully extended the withdrawal of the ball 419f from the enlarged portion 419e of the tubular member 419c permits the closure member to detach itself from the parachute 416a in the manner described above. Both of the parachutes become inflated and carry the airplane to safety on the ground.

Figures 24 and 25 illustrate that a plurality of parachutes may be employed for each airplane. In some instances, a single parachute similar to that shown in Figs. 1 to 21, inclusive, may be employed at the forward end of an airplane and another parachute may be employed at the tail of the airplane as illustrated in Figure 23.

While I have shown and described certain embodiments of my invention, it is to be understood that it is capable of many modifications. Changes, therefore in the construction and arrangement may be made without departing from the spirit and scope of the invention as disclosed in the appended claims, in which it is my intention to claim all novelty inherent in my invention as broadly as possible, in view of the prior art.

I claim:

1. In an airship, a housing member, a parachute folded in said housing member, a closure member for said housing member, means for detachably securing said closure member to said parachute, a tubular member, shroud lines connecting said parachute to said tubular member, anchor lines connecting said tubular member to said airship, a plunger having said tubular member telescoped thereon for projecting said parachute, said tubular member and said closure member from said airship, and means for actuating said plunger.

2. In an airship, a housing member, a parachute folded in said housing member, a closure member for said housing member, means for detachably securing said closure member to said parachute, a tubular member, shroud lines connecting said parachute to said tubular member, anchor lines connecting said tubular member to said airship, a plunger slidably carrying said tubular member for projecting said parachute, said tubular member and said closure member from said airship, and spring means for actuating said plunger.

3. In an airship, a housing member, a parachute folded in said housing member, a closure member for said housing member, means for detachably securing said closure member to said parachute, a tubular member, shroud lines connecting said parachute to said tubular member, anchor lines connecting said tubular member to said airship, a plunger slidably carrying said tubular member for projecting said parachute, said tubular member and said closure member from said airship, and fluid actuated means for actuating said plunger.

4. In an airship, a housing member, a parachute folded in said housing member, a heavy closure member over said housing member, readily detachable means detachably securing said closure member to said parachute, a tubular member, shroud lines connecting said parachute to said tubular member, spool devices on which said shroud lines are coiled, anchor lines connecting said tubular member to said airship, a plunger slidably carrying said tubular member for forcibly projecting said parachute and said closure member from said airship, and means for actuating said plunger.

5. In an airship, a parachute, a plunger for projecting said parachute from said airship, a tubular member slidably mounted on said plunger, anchor lines connecting said tubular member to said airship, spool devices on which said anchor lines are coiled, shroud lines connecting said parachute to said tubular member, spool devices on which said shroud lines are coiled, and means for actuating said plunger.

6. In an airship, a parachute, a tubular member, shroud lines connecting said parachute to said tubular member, anchor lines connecting said tubular member to said airship, conical spool devices around which said shroud lines and said anchor lines are coiled, conical housing members surrounding said spool device having apertures at their tops to hold said lines in place, and means for forcibly projecting said parachute from said airship.

JOHN JUERGENS.